Patented Dec. 18, 1951

2,579,095

UNITED STATES PATENT OFFICE 2,579,095

PHOTOPOLYMERIZATION PROCESS AND PHOTOPOLYMERIZABLE COMPOSITIONS OF MATTER

Carrol C. Sachs, North Hollywood, and John Bond, West Los Angeles, Calif., assignors to Alexander H. Kerr & Co., Los Angeles, Calif., a corporation of Nevada No Drawing. Application November 10, 1947, Serial No. 785,182

21 Claims. (Cl. 204—158)

The photochemical polymerization of the ethylenically unsaturated monomers and low molecular weight polymers of such unsaturated monomers has been described in the prior art, and it has also been shown that certain compounds have the property of catalyzing their photochemical polymerization.

We have found that halosulfonyl compounds, containing an $SO_2X$ radical (where X is halogen) and wherein the unsatisfied valency of sulfur is joined either to a halogen or to an aryl, or alkyl radical, are active photochemical polymerization catalysts. The radicals may be substituted by nonpolar or electronegative groups.

It is generally well known that certain of the organic resinophoric compounds are light-sensitive in that light reduces the induction period or increases the rate of polymerization. Such compounds are those resinophoric compounds which contain radicals which include an ethylene linkage and which polymerize according to the vinyl type of polymerization. Such compounds have been classed as vinyl types (see Plastics, Resins and Rubber, by Paul O. Powers, Chemical and Engineering News, October 25, 1946, vol. 24, No. 200, page 2784).

These include the acrylic resins, i. e., resins produced by polymerization of acrylic acid or derivatives of acrylic acid, for example, methyl acrylic acid, or methyl, ethyl, butyl acrylate, methyl methacrylate, ethyl methacrylate, butyl methacrylate, isobutyl methacrylate. Such types also include styrene and its derivatives, for example, styrene and the alkyl nuclear substituted styrenes, such as ortho or metamethyl styrene or the chlorinated styrenes. It also includes chloroprene. This type also includes the allyl compounds, such as allyl alcohol and allyl alcohol condensed with poly basic acids, as in allyl maleate or allyl phthalate or the condensate of allyl alcohol with polybasic acids and polyhydric alcohols to form suitable copolymers, as in the case of allyl diglycol carbonate.

Such types also include vinyl acetate, vinyl halides, for example, vinyl chloride and vinylidene halides, for example, vinylidene chloride.

The addition of a small amount of the photopolymerization catalyst of our invention to the photopolymerizable monomers or partial polymers positively catalyzes the photopolymerization materially.

These catalysts are also active for mixed monomers or mixed partial polymers or for the polymerization of mixed monomers or mixed partial polymers capable of co-polymerization. Our catalysts catalyze the photopolymerization of copolymers of esters of unsaturated glycols such as ethene or butene diols and unsaturated dicarboxylic acids, such as maleic, fumaric, or itaconic acid, or copolymers thereof with the above vinyl type of resinophoric compounds, as, for example, vinyl acetate or styrene.

Cross linking agents may be employed which contain two or more terminal ethylene linkages ($CH_2=C<$) which may enter into a vinyl type of polymerization. These include ethylene dimethacrylate; allyl methacrylate; methallyl methacrylate; ethylene glycol dimethacrylate; hexamethylene glycol dimethacrylate; dimethallyl carbonate; and similar compounds.

All of the above resinophoric compounds contain $>C=C<$ (ethylenic) linkages in resinophoric arrangement. As stated above, certain of them are of the vinyl type and others, particularly certain of the ester types, are not all strictly classifiable as vinyl type polymers, in that their polymerization is not strictly of the vinyl type, since cross linkage to form three-dimensional resins is also possible. These may be classed as the nonvinyl ester type resinophors. They are all classifiable as ethylenically unsaturated resinophors and since, especially when catalyzed by our catalysts, they are photochemically polymerizable, they may thus be classed as ethylenically unsaturated photochemically polymerizable resinophoric compounds.

We prefer, when we desire to produce a colorless polymer, such as a clear transparent material, or, where the color imparted by the catalyst would be undesirable, to employ such compounds which do not contain the active chromophor groups which impart strong color to the polymer or do not contain groups which, on reaction, form the strong chromophor groups. Such strong chromophor groups include the following:

(—N=N—) azo 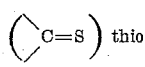 thio (—N=O) nitroso (—N—O—N—) azoxy 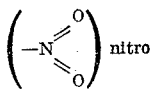 nitro (—N=N—CH₃) azomethane The catalysts having aromatic groups with condensed rings greater than 2 are more sensitive to chromophor action than the phenyl or naphthyl types in that weak chromophor groups, which do not impart color to naphthalene, may impart color to anthracene, phenanthrene, etc.

Certain groups such as the >C=O carbonyl are known to be chromophoric, when present in multiple or when present together with the so-called auxochrome groups.

These auxochrome groups may not of themselves impart color but when present, in addition to the chromophor, augment the action of the chromophor group. These auxochrome groups include the amino or substituted amino groups, the hydroxyl and the methoxy groups, or the halogen group.

A further desirable property is that the catalyst be soluble or colloidally dispersible in the monomer or partial polymer in which it is to be employed.

Examples of such sulfonyl halides which are herein given by way of illustration, and not as a limitation of our generic invention, include: sulfuryl chloride, methane sulfonyl chloride, ethane sulfonyl chloride, benzene sulfonyl chloride, p-toluene sulfonyl chloride, xylene sulfonyl chloride, beta-naphthalene sulfonyl chloride.

Generally the sunfonyl chloride may be that of the alkyl, the aryl alkane, where the sulfo group is attached to the alkyl radical, or the aryl or alkaryl sulfonyl chlorides, where the sulfo group is attached to the ring, or the brom, iodo and fluorine analogues thereof.

We may also employ such compounds having substituted in the hydrocarbon radical additional alkyl, alkoxy, hydroxy, carbonyl halogen or haloalkyl, and the term aryl, or alkyl, refers both to the hydrocarbon radical as such as well as to the radical so substituted.

The book "Organic Chemistry of Sulfur" by Suter, published by John Wiley & Sons Inc., Chapter V, lists a large number of sulfonyl halides, and reference may be had to the list given there for other types, which are classifiable within the generic type of sulfonyl chlorides which we have found to be photopolymerization catalysts, as set forth herein.

Generically, our invention derives from the discovery that such sulfonyl chlorides, including chlorosulfonyl chloride (sulfuryl chloride) which are dispersible in the resins, preferably at ordinary atmospheric temperature, catalyze the polymerization of the ethylenically unsaturated resinophoric compounds.

This invention is generic to the use of these types as photopolymerization catalysts of the ethylenically unsaturated photopolymerizable resinophoric compounds.

The following examples given as illustrative and not as limitations of our invention, illustrate the activity of the group of photochemical catalysts generically defined above:

Example 1

The following mixtures of the listed catalysts and methyl methacrylate monomer, each in amount of 1% of the monomer, were separately and simultaneously exposed in open glass beakers to sunlight for one hour and thirty-five minutes together with a blank of methyl methacrylate monomer containing no catalyst. Sunlight fell upon the open beaker as well as illuminating the sides. The composition of the various samples and their sample number is given in the following table:

| Sample | Composition |
| --- | --- |
| 0 | methyl methacrylate—no catalyst. |
| 1 | methyl methacrylate+1% sulfuryl chloride. |
| 2 | methyl methacrylate+1% benzene sulfonyl chloride. |
| 3 | methyl methacrylate+1% p-toluene sulfonyl chloride. |
| 4 | methyl methacrylate+1% xylene sulfonyl chloride. |
| 5 | methyl methacrylate+1% beta-naphthalene-sulfonyl chloride. |
| 6 | methyl methacrylate+thionyl chloride. |

After the above exposure of one hour and thirty-five minutes, the samples were separately mixed with methyl alcohol. The precipitated polymer was filtered, washed, dried, and weighed. The yield of polymer was as given in the following table:

| Sample No. | Per cent polymer by weight of monomer |
| --- | --- |
| 0 | No polymer |
| 1 | 5.7 |
| 2 | 2.9 |
| 3 | 5.1 |
| 4 | 12.7 |
| 5 | 31.9 |
| 6 | 3.6 |

Example 2

A like experiment was conducted using as catalyst ethane sulfonyl chloride in a like 1% solution and exposing the same in a like 250 cc. beaker in a similar manner to sunlight, but for a period of three hours and twenty minutes. The yield of polymer determined as above in Example 1 was 2.9%, while the blank of methyl methacrylate monomer with no catalyst and exposed under like conditions for like time showed no polymer formation.

While the above example illustrates the effectiveness of these compounds in polymerization of the resinophoric types polymerizing according to simple vinyl type of polymerization, the following examples illustrate the applicability thereof to the polyester type and the polyester and copolymer type of the so-called contact resins.

Example 3

1% of beta-naphthalene sulfonyl chloride was dissolved in allyl diglycol carbonate and placed in a glass vial; a second vial was similarly filled with the uncatalyzed allyl diglycol carbonate and both exposed in the sunlight for six hours. After the exposure the contents of the vials were treated with methyl alcohol for precipitation of the polymers according to the procedure of Example 1. The uncatalyzed ester showed no polymer formation, while the catalyzed ester showed a formation of polymers equal to 2.7% of the charge.

Example 4

The various mixtures employed listed below were painted on wooden panels and exposed to sunlight for two hours, with the following results:

The mixed monomers employed were tripropylene glycol maleate and styrene in equimolar ratio.

In these mixed monomers were dissolved 1% of each of the following catalysts to form mixtures which were each painted on the panels and exposed as above with the results below:

| Catalyst | Result |
| --- | --- |
| Thionyl chloride | Cured hard. |
| Sulfuryl chloride | Do. |
| Ethane sulfonyl chloride | Cured soft. |
| Benzene sulfonyl chloride | Cured hard. |
| p-toluene sulfonyl chloride | Tacky. |
| Xylene sulfonyl chloride | Cured hard. |
| Beta-naphthalene sulfonyl chloride | Do. |
| No catalyst | No cure—monomers unchanged. |

*Example 5*

In this example the mixed monomers (diethylene glycol maleate and styrene) in equimolar ratio was employed; to this mixture was added the following catalyst:

| Sample | Catalyst |
| --- | --- |
| 1 Blank | No catalyst. |
| 2 | +1% benzoyl peroxide. |
| 3 | 1% beta-naphthalene sulfonyl chloride. |
| 4 | 1% beta-naphthalene sulfonyl chloride and 1% benzoyl peroxide. |

The mixtures were each placed in 4-dram glass vials and simultaneously exposed to sunlight; after twenty minutes the mixtures were observed to have reached the state listed in the table below:

| Sample | Result |
| --- | --- |
| 1 | No cure. |
| 2 | Do. |
| 3 | Cured partly. |
| 4 | Do. |

Wood panels were separately painted with these mixtures and simultaneously exposed to sunlight for seven minutes with the results shown below:

| Sample | Result |
| --- | --- |
| 1 | No cure. |
| 2 | Do. |
| 3 | Tack-free gel. |
| 4 | Gelled. |

The amount of catalyst employed will depend on the desired rate of polymerization and also on the specific activity of the particular catalyst under consideration, as well as on the intensity of the illumination by the polymerizing light. It will also be found that an excessive concentration of catalyst may interfere with the polymerization and be detrimental. While the catalyst concentration may be minute, if not used in sufficient quantity activity is impaired.

With these considerations in mind it will be found that from about .01% to about 5% of catalyst will be, in most cases, a useful concentration to employ.

The photochemical polymerization of the resins apparently is greatest by light of wave length less than about 3500 Angstroms. Usual photochemical sources of actinically active light such as mercury or carbon arc light or direct sunlight or incandescent filament lamps are thus effective.

The relative effectiveness of the various wave lengths of light will in part depend upon the nature of the catalyst and its concentration as well as on the nature of the resinophor or resulting polymer, as well as the intensities of the illumination. Since usual light sources, such as the ultraviolet light sources, as, for example, mercury or carbon arc light or visible light sources, such as incandescent lamps or sunlight, contain suitable actinically active wave lengths, they form suitable sources of illumination for the purpose of our invention.

The previous examples indicate the utility of the photopolymerization catalysts of our invention in the photopolymerization of monomers and partial polymers according to the so-called bulk method. In such methods the catalyst in the desired percentage is dissolved monomers or partially bulked or polymerized monomers of sufficiently low viscosity to permit of the incorporation of the catalyst. The resinophoric compound containing the catalyst may be polymerized photochemically by exposing the same to a source of ultra-violet or visible light. Temperature control to prevent excessive generation of heat during polymerization is desirable. The illumination may be by a light source positioned above the exposed surface of the container or where the container is light-transmitting, as when it is of glass, it may be made from a light source through the glass vessel. There are now available ultraviolet light sources which may be suspended inside the reaction vessel and these may be conveniently used.

The vessel may be of the desired shape to form a mold to give a molded casting of desired shape. Photochemical laminations may also be made as when the sheets being laminated are light-transmitting as, for example, if they be made of fibre glass, glass sheets, or plastic mesh or plastic sheets. In such cases the laminate, especially when the resin employed is of the contact type, may be formed into the desired laminate of the desired shape and set by photochemical means, as by exposing the laminate to sunlight or to a special source of illumination as indicated above.

The casting or the laminate may be further baked if further hardening or polymerization of the photopolymerized produce is desired.

The photopolymerization process may be carried out at low or at elevated temperatures but as the temperatures become high, bubbles and striations may be formed in the castings. Since the catalyzed photopolymerization permits of rapid polymerization at low temperatures to produce bubble-free castings, it is usually preferable to cause the reaction to occur at ordinary atmospheric temperatures and, if desired, even at low temperatures, i. e., at temperatures ranging from 5 to 50° C. These temperature limits are not critical and merely indicate that heat is not necessary to cause the reaction to proceed.

Where thermal polymerization is not inhibited by these catalysts, thermal polymerization may be carried out simultaneously with photochemical polymerization. Elevated temperatures are not a hindrance so long as they are not so high as to cause bubbles or other defects, as will be recognized by those skilled in the art.

Photopolymerization employing our catalyst may also be carried out in a solution of the monomer or partial polymer in a volatile solvent. Thus, the monomer or partial polymer containing the catalyst is dissolved in a solvent and introduced into a vessel and illuminated. Usual precautions against the loss of solvent and cooling, where necessary to avoid overheating, may be employed. The solution is illuminated in a manner similar to that described above for bulk polymerization. Instead of polymerizing a bulk quantity solution in a vessel, we may saturate a sheet or a plurality of sheets arranged in laminated form with such solution and photopolymerize in a manner similar to that described above. The solvent may be evaporated either during, prior to, or subsequent to the photopolymerization.

Emulsion or granular polymerization may also be employed. Conventional dispersing agents may be used and the process otherwise carried out similarly to conventional thermal emulsion polymerization except that the photopolymerization catalyst is added to the monomer or partial polymer before mixing with the water and the protective colloid and the emulsion irradiated. The mixture is vigorously stirred and illuminated in a manner similar to that described above.

When a similar dispersion of the monomer, but not containing the catalyst, was treated in the above manner, no polymer was formed.

We may, if desired, add conventional thermal polymerization catalysts, such as the peroxide catalysts like benzoyl, lauroyl, tertiary butyl hydrogen peroxide in addition to the photopolymerization catalyst. Thus, photopolymerization may be carried on either at low or at elevated temperatures and the photopolymerized gel may be hardened further by heating the photochemically gelled product. This permits of a relatively low temperature setting of the resin to prebodied form or to a relatively hard casting which may then be baked at an elevated temperature.

This is equally true when laminating. Thus, the laminate may be set at relatively low temperature by photopolymerization and the laminating bond hardened by baking.

By this process not only is the clearness and the integrity of the hardened gel increased, but the photopolymerization step accelerates the total time of cure.

The rate of photopolymerization may also be increased by suitable concentrations of the catalyst as indicated above.

When oxygen is found to deleteriously affect the rate of polymerization, vessels containing the material undergoing photopolymerization may be evacuated of air or an inert gaseous atmosphere, as, for instance, a nitrogen atmosphere, may be employed.

It will be understood by those skilled in this art that fillers, pigments, and other ingredients may be added to the monomers or partial polymers, where desired, and that these photopolymerizable catalyzed resinophors may be used with other ingredients in applications to which such resinophors are now employed and in which the catalyzed photopolymerization may prove advantageous.

The above description and examples are intended to be illustrative only. Any modification of and variation therefrom which conforms to the spirit of the invention is intended to be included within the scope of the claims.

We claim:

1. A process for photopolymerization of a photopolymerizable ethylenically unsaturated resinophoric compound which comprises adding to such resinophoric compound from about .01% to about 5% of a compound containing the $SO_2X$ radical in which radical X is a halogen, the remaining valency of the S being satisfied by a radical chosen from the group consisting of aryl, alkyl and halogen radicals and irradiating said mixture with light.

2. A process for photopolymerization of a photopolymerizable ethylenically unsaturated resinophoric compound which comprises mixing with such ethylenically unsaturated resinophoric compound from about .01% to about 5% of toluene sulfonyl halide and irradiating said mixture with light.

3. A process for photopolymerization of a photopolymerizable ethylenically unsaturated resinophoric compound which comprises mixing with said ethylenically unsaturated resinophoric compound from about .01% to about 5% of toluene sulfonyl chloride and irradiating said mixture with light.

4. A process for photopolymerization of a photopolymerizable unsaturated resinophoric compound which comprises mixing said ethylenically unsaturated resinophoric compound with a small proportion of xylene sulfonyl halide and irradiating said mixture with light.

5. A process for photopolymerization of a photopolymerizable unsaturated resinophoric compound which comprises mixing said ethylenically unsaturated resinophoric compound with from about .01% to about 5% of xylene sulfonyl chloride and irradiating said mixture with light.

6. A process for photopolymerization of a photopolymerizable unsaturated resinophoric compound which comprises mixing said ethylenically unsaturated resinophoric compound with from about .01% to about 5% of beta naphthalene sulfonyl halide and irradiating said mixture with light.

7. A process for photopolymerization of a photopolymerizable unsaturated resinophoric compound which comprises mixing said ethylenically unsaturated resinophoric compound with from about .01% to about 5% of beta naphthalene sulfonyl chloride and irradiating said mixture with light.

8. A photopolymerizable composition of the class described consisting essentially of an ethylenically unsaturated resinophor containing dispersed therein from about .01% to about 5% of a photopolymerization catalyst containing the radical $SO_2X$ in which radical X is a halogen, the remaining valency of the S being satisfied by a radical chosen from the group consisting of aryl, alkyl and halogen radicals.

9. A photopolymerizable resinophoric composition of matter consisting essentially of an ethylenically unsaturated resinophoric compound containing dispersed therein from about 0.1% to about 5% of toluene sulfonyl halide.

10. A photopolymerizable resinophoric composition of matter consisting essentially of an ethylenically unsaturated resinophoric compound containing dispersed therein from about .01% to about 5% of toluene sulfonyl chloride.

11. A photopolymerizable resinophoric composition of matter consisting essentially of an ethylenically unsaturated resinophoric compound containing dispersed therein from about .01% to about 5% of xylene sulfonyl halide.

12. A photopolymerizable resinophoric composition of matter consisting essentially of an ethylenically unsaturated resinophoric compound containing dispersed therein from about .01% to about 5% of xylene sulfonyl chloride.

13. A photopolymerizable resinophoric composition of matter consisting essentially of an ethylenically unsaturated resinophoric compound containing dispersed therein from about .01% to about 5% of beta naphthalene sulfonyl halide.

14. A photopolymerizable resinophoric composition of matter consisting essentially of an ethylenically unsaturated resinophoric compound containing dispersed therein from about .01% to about 5% of beta naphthalene sulfonyl chloride.

15. A process for photopolymerization of a photopolymerizable ethylenically unsaturated resinophoric compound which comprises irradiating with light a composition consisting essentially of an ethylenically unsaturated resinophoric compound containing dispersed therein from about .01% to about 5% of a photopolymerizing catalytic compound containing the radical $SO_2X$ in which radical X is a halogen, the remaining valency of the S being satisfied by a radical chosen from the group consisting of aryl, alkyl, and halogen radicals, and causing the polymerization of said resinophor.

16. A process for photopolymerization of a photopolymerizable ethylenically unsaturated resinophoric compound which comprises irradiating with light a composition consisting essentially of an ethylenically unsaturated resinophoric compound containing dispersed therein from about .01% to about 5% of toluene sulfonyl halide, and causing the polymerization of said resinophor.

17. A process for photopolymerization of a photopolymerizable ethylenically unsaturated resinophoric compound which comprises irradiating with light a composition consisting essentially of an ethylenically unsaturated resinophoric compound containing dispersed therein from about .01% to about 5% of toluene sulfonyl chloride, and causing the polymerization of said resinophor.

18. A process for photopolymerization of a photopolymerizable ethylenically unsaturated resinophoric compound which comprises irradiating with light a composition consisting essentially of an ethylenically unsaturated resinophoric compound containing dispersed therein from about .01% to about 5% of xylene sulfonyl halide, and causing the polymerization of said resinophor.

19. A process for photopolymerization of a photopolymerizable ethylenically unsaturated resinophoric compound which comprises irradiating with light a composition consisting essentially of an ethylenically unsaturated resinophoric compound containing dispersed therein from about .01% to about 5% of xylene sulfonyl chloride, and causing the polymerization of said resinophor.

20. A process for photopolymerization of a photopolymerizable ethylenically unsaturated resinophoric compound which comprises irradiating with light a composition consisting essentially of an ethylenically unsaturated resinophoric compound containing dispersed therein from about .01% to about 5% of beta naphthalene sulfonyl halide, and causing the polymerization of said resinophor.

21. A process for photopolymerization of a photopolymerizable ethylenically unsaturated resinophoric compound which comprises irradiating with light a composition consisting essentially of an ethylenically unsaturated resinophoric compound containing dispersed therein from about .01% to about 5% of beta naphthalene sulfonyl chloride, and causing the polymerization of said resinophor.

CARROL C. SACHS.
JOHN BOND.

REFERENCES CITED

The following references are of record in the file of this patent:

UNITED STATES PATENTS

| Number | Name | Date |
|---|---|---|
| 1,891,203 | Ambros et al. | Dec. 13, 1932 |
| 2,212,786 | McQueen | Aug. 27, 1940 |
| 2,333,633 | Britton et al. | Nov. 9, 1943 |

FOREIGN PATENTS

| Number | Country | Date |
|---|---|---|
| 338,152 | Great Britain | Nov. 14, 1930 |

OTHER REFERENCES

Berkman et al.; Catalysis (1940), p. 977.